United States Statutory Invention Registration [19]

[11] Reg. Number: H764

Fair [43] Published: Apr. 3, 1990

[54] NITRATION OF WOODPULP

[76] Inventor: David F. Fair, 102 Mountain View Dr., Hackettstown, Warren County, N.J. 07840

[21] Appl. No.: 350,177

[22] Filed: May 3, 1989

[51] Int. Cl.[4] ..... C08B 5/04

[52] U.S. Cl. ..... 536/38

*Primary Examiner*—Matthew A. Thexton
*Assistant Examiner*—Chhaya Sayala

[57] ABSTRACT

The improvement of providing a shearing force to bundles of woodpulp to physically break apart the same into component parts simultaneously with nitration of said woodpulp in a tank containing nitric acid, sulfuric acid, and water.

4 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NITRATION OF WOODPULP

GOVERNMENTAL INTEREST

The invention described herein may be manufactured, used and licensed by or for the Government for Government purposes without payment to me of any royalties thereon.

FIELD OF USE

In general, this invention relates to improvements in the process of producing nitropulp.

More particularly, this invention relates to the improvement in the physical conditioning of wood pulp during nitration, to permit the use of nitropulp in products which traditionally use nitrocotton, and to permit the use of sulfate wood pulp.

Furthermore, this invention by improving the physical condition of the nitropulp will permit more thorough washing of the acid laden nitropulp in the centrifuge, (acid removal step) eliminating the need for expensive post treatment to recover the entrained acids, and prevent their loss as a source of pollution.

BACKGROUND OF INVENTION

Nitrocellulose of the grade, which is of effective and efficient use in a propellant, is preferably made from cotton for multi-base propellants, and sulfite wood pulp for single base propellants.

In the past, woodpulp of the sulfite variety has been found to be acceptable to produce nitropulp which could serve as a substitute for nitrocotton. But, due to the density of the sulfite pulp, it is difficult to nitrate. Thus, one cannot reliably get the same performance as nitro cotton. Further, sulfite wood pulp has a limited source of supply because it is currently available from only one U.S. manufacturer.

Woodpulp of the sulfate variety is of a more abundant supply when compared to the supply of wood pulp of the sulfite variety for which there is one source in the U.S. It also qualified, in time of war, as a source of woodpulp. However, in the past, it has been found that the sulfate variety of woodpulp is quite difficult to nitrate because of its density. In many cases, this leads to the rejection of the entire lot during processing.

It is an object of this invention to provide for the substitution of woodpulp of the sulfate variety for cotton in the process of producing nitropulp.

Another object is to provide for a more uniformly nitrated woodpulp of the sulfate and sulfite variety for use in propellants.

A further object is to provide for more effective washing of the fibers of nitropulp of the sulfate and sulfite variety, and a more efficient recovery of the spent nitrating acid solution.

Another objective is to increase the production capacity of existing manufacturing facilities by 25% by expanding the use of wood pulp and sheeted cotton linters which have nearly twice the through put capability.

A still further object is to eliminate the need for costly pollution abatement equipment and operating expenses from the process of nitrating woodpulp of the sulfate and sulfite variety.

These and other objects will become more apparent from a reading of the following detailed specification.

SUMMARY OF INVENTION

Nitrocotton for military application is made from baled cotton linters.

Nitrocotton can be made from sheeted cotton linters, however, it has many of the same problems as nitropulp made from sheeted pulp. This is due to the density with which the cellulose fibers are packed in sheeted linters.

Based upon past laboratory and pilot scale work indication is that wood pulp fluffed prior to or during contacting with nitrating provides a product equal in properties to baled cotton linters. Fluffing the wood pulp provides a feed stock that is less dense, and physically very much like baled cotton linters. Presently, sheet feed stocks are fed in shredded condition which consists of lose fibers and pellets, or chunks of the starting sheet. A disperser or emulsifier will accomplish the effect of fluffing the wood pulp, after drowning in the nitrating acids. This produces a product that can be used in lieu of nitrocotton.

The above is accomplished, if the disperser or emulsifier is placed in at least one of the initial nitrating pots in place of the present day agitators. This can be accomplished with only minor modification to the existing equipment. The best location of the dispenser or emulsifier is in the first, or second nitrating pots.

The above cited devices each will break apart the small pellets of pulp to enable better contact with the nitrating acid. This allows a more uniform nitration of the product, and a more uniform washing of the pulp in the centrifuge.

The disperser or emulsifier, after opening the cellulose bundles, permits better contact with the nitrating acid, and accomplishes the effect of fluffing.

There would be no safety hazard. Each device has no enclosed operating parts. The units would replace existing agitators, with very little modification to the equipment, existing in the present-day process.

A similar approach is used in Europe. The cellulose is fed to a prenitration and thence to a defibrator prior to be passed to a nitration equalization tank.

The problem with this approach is that the defibrator is a closed reactor and presents a major safety problem to due to the potential for explosion.

Previous attempt to fluff the cellulose consisted of two approaches. The first approach was to fluff the pulp in an attrition mill with water. Then to dry the pulp. After drying, it was nitrated like baled cotton linters and had very similar properties to the nitro cotton. This approach was not acceptable due to the cost of grinding and then drying the pulp so a second approach was developed. The second approach was to grind the pulp in the attrition mill but to add nitrating acid in lieu of water. This pulp was ground and drowned in nitrating acid in one step. This procedure was not acceptable because the closed attrition mill presented explosion hazard and the attrition mill was very difficult to maintain.

PREFERRED EMBODIMENT

In the present approach, the acid and woodpulp of pellet size is fed into a series of nitration pots. However, in this approach, a disperser or emulsifier is substituted for the agitator of one or more of the initial nitration pots, to improve the conditions of nitration of the wood pulp. In addition, the mixed acid recycle or secondary washing stage can be removed from the process, because removal of the acid from the nitro pulp will be vastly superior to that now accomplished, and too much acid would be removed to accomplish stabilization if secondary washing was performed The nitration pot now becomes a contacting and mixing pot to improve the nitrating conditions. The subsequent pots in series retain the function of equalization pots. The above cited substitution of the present invention improves the quality of the nitropulp produced by the nitration process. This allows the substitution of the lower cost nitro-pulp, of the sulfate variety, for the very costly nitrocotton in propellants. This increases the capacity of the line to make nitrocellulose because the through put with nitro pulp is twice that of nitro cotton. Also, since the new process permits greater through put and eliminates the need for secondary washing, the cost of manufacture and the cost of facilities are greatly reduced. Previous to this invention, nitrocotton was the preferred material for the manufacture of propellants, This is because the required physical characteristics for propellants are not obtained with nitropulp produced by processes prior to this invention.

EXAMPLE

The wood pulp is received as a rolled sheet from the manufacturer. The sheets are unrolled and dried prior to use. At this point, the sheets are fed into a cutter or grinder which produces small chunks of woodpulp. The cut woodpulp is pneumatically conveyed to the nitrating house where the woodpulp is held in a bin. From the bin, the woodpulp is metered into the first nitrating pot with nitric acid and sulfuric acid in an amount and concentration conventionally utilized in the processing of nitrocellulose. The nitric acid must penetrate the fiber bundles. The penetration of the woodpulp fiber bundles by the nitrating acid is an equilibrium reaction. As the wood pulp is nitrated, water is evolved. This water then dilutes the nitrating acid until it can be chemically bound up by sulfuric acid which acts as a dehydrating agent. Given sufficient time, an equilibrium is established. This equilibrium is harder to establish with woodpulp than baled cotton linters due to the time it takes the acid to penetrate, and come to equilibrium throughout the fiber bundle.

At this point, the nitrated woodpulp flows into a series of interconnected nitrating pots. Usually there are 6 to 8 nitrating pots in series. The second or third nitrating pots contain a disperser or emulsifier. The dispenser which is preferred is that manufactured by Charles utilized is that also manufactured by Charles Ross and Son Company, Hauppauge, N.Y. The dispersers or emulsifiers open up the bundles of chips or pellets into a wet-fluff of fibers. This provides better contact of the acids with the center of the chips or pellets reducing the reaction time.

In comparison, the agitators, presently used in processing, just stir the mass in the vat at low shear. However, the dispersers operate at high speed or velocity, and high shear. The latter beats the pulp into fibers. A buildup of nitrocellulose will not be found with the use of a disperser as described. Further, if an emulsifier is used, the pellets are forced through a series of holes in the periphery thereof. Thus, depending upon the tolerances selected, the emulsifier can be used either as a grinder or as a defibrator to open the fiber bundles. The fine holes act as a grinder.

The opening up of the fibers also improves the processability of the slurry in the centrifuging/washing operation and eliminates the need for a subsequent costly counter current washing step after centrifuging. Since the fiber bundles have been opened up, the nitro pulp drains better in the centrifuging or acid removals operation. The draining characteristics are so improved that after the counter current wash performed in the centrifuge, the second wash normally referred to the "mixed acid recycle" washing is no longer needed. Also because the materials in process drains better, the denitration reaction in the centrifuge is minimized resulting in a more uniform product.

In conclusion, woodpulp of the sulfate variety behaves very much like cotton in the above cited nitration process when the present invention is utilized. Due to the fact that the agitator breaks apart the pellets of woodpulp, the product is more uniformly nitrated approaching that achieved with nitrocellulose made from cotton. Further, an ease of processing is achieved with the use of woodpulp of the sulfate variety during the nitration thereof. If a disperser or emulsifier is not used, the product is a high density chip. In such a state, the acid has difficulty penetrating the chips or pellets.

In addition, an improvement in the amount of acids recovered is achieved. This is because the pellets are opened up, and the acid is not trapped in the interior thereof during the centrifuging operation. Further, the addition of disperser or emulsifiers to the nitration pots utilized in the process is not costly. This is because there is no other change in the conventional process except for the removal or deletion of a counter current washing step now known as "mixed acid recycle". The latter operation can be by-passed or omitted from new facilities at cost savings in the range of $2–5 million. "Mixed acid recycle" is currently only used with nitropulp and the operation is by passed with nitrocotton. With the use of the present invention, the same amount of steps are utilized to process the woodpulp as with nitro cotton. The use of this invention in place of the present day agitators will reduce overall manufacturing costs because the "mixed acid recycle" operation can be eliminated.

The foregoing disclosure is merely illustrative of the principles of this invention and is not to be interpreted in a limiting sense. I wish it to be understood that I do not desire to be limited to the exact details shown and described because of obvious modifications will occur to a person skilled in the art.

What is claimed is:

1. In the improved process of nitrating pellet-like bundles of woodpulp, the improvement of providing a shearing force to said bundles to physically break apart the same into component parts simultaneously with nitration of said woodpulp in a tank containing nitric acid, sulfuric acid, and water.

2. The process of claim 1 wherein said shearing force is provided by a high speed shearing agitator.

3. The process of claim 2 wherein said agitator is a disperser.

4. The process of claim 2 wherein said agitator is an emulsifier.

* * * * *